United States Patent
Hole (10) Patent No.: US 9,516,559 B2
(45) Date of Patent: Dec. 6, 2016

(54) METHODS OF PERFORMING CELL CHANGE WITHOUT RECEIVING DESCRIPTION OF RESOURCES IN A TARGET CELL

(75) Inventor: David Philip Hole, Slough (GB)

(73) Assignee: BlackBerry Limited, Waterloo, Ontario (CA)

( * ) Notice: Subject to any disclaimer, the term of this patent is extended or adjusted under 35 U.S.C. 154(b) by 71 days.

(21) Appl. No.: 12/690,750

(22) Filed: Jan. 20, 2010

(65) Prior Publication Data
US 2011/0177816 A1    Jul. 21, 2011
US 2012/0003975 A2    Jan. 5, 2012

(51) Int. Cl.
*H04W 36/00*    (2009.01)
*H04L 12/66*    (2006.01)
*H04W 76/02*    (2009.01)

(52) U.S. Cl.
CPC ....... *H04W 36/0072* (2013.01); *H04W 76/028* (2013.01)

(58) Field of Classification Search
CPC ............. H04W 36/00; H04W 36/0005; H04W 36/0016; H04W 36/0072; H04W 76/028
USPC ......................................... 455/442
See application file for complete search history.

(56) References Cited

U.S. PATENT DOCUMENTS

| | | | | |
|---|---|---|---|---|
| 5,483,524 | A * | 1/1996 | Lev et al. | 370/355 |
| 7,957,743 | B2 * | 6/2011 | Moe et al. | 455/439 |
| 2005/0261017 | A1 * | 11/2005 | Vaittinen et al. | 455/522 |
| 2006/0116118 | A1 * | 6/2006 | Charriere et al. | 455/423 |
| 2007/0010252 | A1 * | 1/2007 | Balachandran ... | H04W 36/0033 455/437 |
| 2007/0086388 | A1 | 4/2007 | Kang et al. | |
| 2008/0130585 | A1 * | 6/2008 | Park et al. | 370/332 |
| 2008/0267153 | A1 * | 10/2008 | Mukherjee et al. | 370/338 |
| 2009/0061881 | A1 * | 3/2009 | Gonsa et al. | 455/442 |
| 2009/9992097 | | 4/2009 | Nylander et al. | |
| 2009/0163206 | A1 | 6/2009 | Adatrao et al. | |

(Continued)

FOREIGN PATENT DOCUMENTS

DE    102008031211    1/2010
EP    0933962 A2    8/2009

(Continued)

OTHER PUBLICATIONS

3GPP: 3GPP Technical Specification Mobile radio interface layer 3 specification; Radio Resource Control (RRC) protocol (Release 9) 3GPP TS44.018 V9.3.0, 1 Dec. 2009, pp. 1, 164-169, XP002624705, Retrieved from the Internet: URL: http://www.3gpp.org/ftp/Specsiarchive/44_series/44.018/44018-930.zip [retrived on Feb. 1, 2011] chapter 9.1.15.

(Continued)

*Primary Examiner* — Huy C Ho
(74) *Attorney, Agent, or Firm* — Fish & Richardson P.C.

(57) ABSTRACT

Methods and systems of performing cell change for a circuit-switched call without a mobile station receiving a description of resources in a target cell are provided. In some embodiments, a command is generated at the serving cell which indicates to the mobile station to perform a cell change without first receiving a description of resources in the target cell. In some embodiments, a command is generated at the target cell which may be like a handover command, but which indicates to the mobile station to perform the cell change without an allocation of resources.

21 Claims, 5 Drawing Sheets

(56) References Cited

U.S. PATENT DOCUMENTS

| | | | |
|---|---|---|---|
| 2009/0291686 A1* | 11/2009 | Alpert et al. | 455/436 |
| 2010/0027507 A1* | 2/2010 | Li et al. | 370/331 |
| 2010/0061337 A1* | 3/2010 | Hallenstal et al. | 370/331 |
| 2010/0075680 A1* | 3/2010 | Ramachandran et al. | 455/436 |
| 2010/0165948 A1* | 7/2010 | Ore et al. | 370/331 |
| 2010/0260147 A1* | 10/2010 | Xing et al. | 370/332 |
| 2010/0290431 A1* | 11/2010 | Yang et al. | 370/331 |
| 2010/0317344 A1* | 12/2010 | Dalsgaard | H04W 74/02 455/436 |
| 2010/0323704 A1* | 12/2010 | Tailor et al. | 455/438 |
| 2011/0090857 A1* | 4/2011 | Guo | 370/329 |
| 2011/0105119 A1* | 5/2011 | Bienas et al. | 455/436 |
| 2011/0274055 A1* | 11/2011 | Wager et al. | 370/329 |
| 2012/0135736 A1* | 5/2012 | Sebire et al. | 455/436 |

FOREIGN PATENT DOCUMENTS

| | | |
|---|---|---|
| WO | 2008/041115 A1 | 4/2008 |
| WO | 2008/131583 A1 | 11/2008 |

OTHER PUBLICATIONS

International Search Report and Written Opinion dated Mar. 22, 2011 from PCT International Application No. PCT/EP2011/050411.
Partial International Search Report dated Mar. 30, 2011 from PCT International Application No. PCT/EP2011/050408.
Motorola Ltd et al.: "Definition of use of E_UTRAN_BA_IND and PSI3_CHANGE_MARK with E-UTRAN related information and other clarifications", 3GPP Draft, GP-091730 [GP-091713] CR_44060-REL-9 E-UTRAN_BA_IND, #rd Generation Partnership Project (3GPP), Mobile Competence Centre; 650, Route Des Lucioles; F-06921 Sophia-Antipolis Cedex; France, vol. TSG GERAN, No. Vancouver; 20090831, Sep. 4, 2009, XP050415754.
Nokia Corporation et al: "Measurement Reporting Parameters for CSG Cells" 3GPP Draft; GP-092022_CSG_PARAMETERS, 3rd Generation Partnership Project (3GPP), Mobile Competence Centre; 650, Route Des Cucioles; F-06921 Sophia-Antipolis Cedex; France, vol. TSG GERAN, No. Sophia, 20091116, Nov. 11, 2009, XP050415993.
Nokia Siemens Networks et al: "Signalling changes for CSG inbound mobility in connected mode", 3GPP Draft; FP-092023_DRAFT_CR_44060_CSG_SIGNALLING, 3rd Generation Partnership Project (3GPP), Mobile Competence Centre; 650, Route Des Lucioles; F-06921 Sophia-Antipolis Cedex; France, vol. TSG GERAN, No. Sophia, 20091116, Nov. 11, 2009, XP050415994.
Partial International Search Report dated May 11, 2011 from PCT International Application No. PCT/EP2011/050410.
LG Electronics Inc: "CSG Cell Detection" 3GPP Draft; R2-097012 Csg Cell Detection, 3rd Generation Partnership Project (3GPP), Mobile Competence Centre; 650, Route Des Ducioles, F-06921 Sophia-Antipolis Cedex; France, No. Jeju; 20091109, Nov. 9, 2009; XP050391385.
R2-097000, "CSG inbound handover—way forward", NTT Docomo, 3GPP TSG-RAN WG2 #68, Jeju, Korea, Nov. 9-13, 2009.
GP-092382 "Working Assumptions on "Inbound Mobility to CSG Cells in Connected Mode"", (source 3GPP Geran WG2), 3GPP TSG GERAN #44, Sophia Antipolis, France, Nov. 16-20, 2009.
R2-097445 CR 36.331-0258 rev 3 "Slight revision of baseline CR capturing agreements on inbound mobility", Samsung, 3GPP TSG-RAN WG2 #68, Jeju, Korea, Nov. 9-13, 2009.
R2-097466 CR 36.331-0318 rev 1 "Introduction of network ordered SI reporting", NTT Docomo, 3GPP TSG-RAN WG2 #68, Jeju, Korea, Nov. 9-13, 2009.
GP-092023 "Signalling Changes for CSG inbound mobility in connected mode" 3GPP TSG-3GPP GERAN #44, Sophia Antipolis, France, Nov. 16-20, 2009.
3GPP TS 44.060 (latest version is v.9.2.0) "General Packet Radio Service (GPRS); Mobile Station (MS)—Base Station System (BSS) interface; Radio Link Control/Medium Access Control (RLC/MAC) protocol". Release 9, Dec. 2009.
3GPP TS 45.008: "Radio subsystem link control". (latest version is v.9.1.0), Release 9, Nov. 2009.
3GPP TS 44.018 "Mobile radio interface layer 3 specification; Radio Resource Control Protocol". (latest version is 9.3.0), Release 9, Dec. 2009.
3GPP TS 48.008 "Mobile Switching Centre—Base Station System (MSC-BSS) interface; Layer 3 specification" (latest version is 9.1.0), Release 9, Dec. 2009.
3GPP TS 43.129 Packed-switched handover for GERAN A/Gb mode; Stage 2 (defines Handover Preparation; latest version is 9.0.0), Release 9, Dec. 2009.
3GPP TS 48.018 "General Packet Radio Service (GPRS); Base Station System (BSS)—Serving GPRS Support Node (SGSN); BSS GPRS protocol (BSSGP)" (latest version is 9.0.0), Release 9, Dec. 2009.
3GPP TS 23.009—V9.0.0, Technical Specification Group Core Network and Terminals; Handover procedures, Release 9, Dec. 2009.
3GPP TS 23.008—V9.1.0, Technical Specification Group Core Network and Terminals;Organization of subscriber data, Release 9, Dec. 2009.
3GPP TS 25.304—V9.0.0, Technical Specification Group Radio Access Network; User Equipment (UE) procedures in idle mode and procedures for cell reselection in connected mode, Release 9, Dec. 2009.
3GPP TS 36.304—V9.1.0, Technical Specification Group Radio Access Network; Evolved Universal Terrestrial Radio Access (E-UTRA); User Equipment (UE) procedures in idle mode, Release 9, Dec. 2009.
3GPP TS 36.104—V9.2.0, Technical Specification Group Radio Access Network; Evolved Universal Terrestrial Radio Access (E-UTRA); Base Station (BS) radio transmission and reception, Release 9, Dec. 2009.
Notice of Allowance and Fee(s) Due mailed Apr. 16, 2014; in corresponding U.S. Appl. No. 12/690,803.
Inter BSC-Intra MSC Handover Call Flow (Dec. 4, 2004); retrieved Dec. 13, 2005. Retrieved from the Internet: http//www.eventhelix.com/RealtimeMantra/Telecom/GSM Handover Call Flow.
Examination Report mailed Oct. 4, 2013, in corresponding European patent application No. 11700413.5.
3rd Generation Partnership Project; Technical Specification Group Services and System Aspects; 3GPP System Architecture Evolution: Report on Technical Options and Conclusions (Release 7), 3GPP TR 23.882, V1.4.2, (Oct. 2006).
3rd Generation Partnership Project; Technical Specification Group Services and System Aspects; Voice Call Continuity (VCC) between Circuit Switched (CS) and IP Multimedia Subsystem (IMS); Stage 2 (Release 7), 3GPP TS 23.206, V7.0.0, (Sep. 2006).
3rd Generation Partnership Project; Technical Specification Group GERAN; Packet-switched handover for GERAN A/Gb mode; Stage 2 (Release 6), 3GPP TS 43.129 V6.9.0 (Sep. 2006).
3GPP TS 44.060 V9.2.0 (Dec. 2009); 3rd Generation Partnership Project; Technical Specification Group GSM/EDGE Radio Access Network; General Packet Radio Service (GPRS); Mobile Station (MS)—Base Station System (BSS) Interface; Radio Link Control/Medium Access Control (RLC/MAC) protocol (Release 9); Dec. 2009.
Notice of Allowance and Fee(s) Due mailed Apr. 16, 2014; in U.S. Appl. No. 12/690,803.
Communication Pursuant to Article 94(3) EPC issued in EP Application No. 11700180.0 issued Aug. 7, 2015; 9 pages.
Communication Pursuant to Article 94(3) EPC issued in EP Application No. 11700648.6 issued Aug. 10, 2015; 6 pages.
Qualcomm Europe, Telecom Italia, Kineto, NSN; 3GPP TSG RAN WG3 Meeting #63bis; R3-090974; "LS on CSG Access Control During Inbound Handover".
Office Action issued in Canadian Application No. 2,784,328 on Sep. 21, 2015; 3 pages.
Communication pursuant to Article 94(3) EPC in European Application No. 11700648.6 issued on Aug. 11, 2016, 5 pages.

(56) References Cited

OTHER PUBLICATIONS

Qualcomm Europe et al:, (DRAFT) LS on CSG Access Control During Inbound Handover, 3GPP TSG RAN WG3 Meeting #63bis, R3-090974, Seoul Korea, Mar. 23-26, 2009, XP050609804.

* cited by examiner

METHODS OF PERFORMING CELL CHANGE WITHOUT RECEIVING DESCRIPTION OF RESOURCES IN A TARGET CELL

BACKGROUND

Some cells are uncontrolled in the sense that a PLMN (public land mobile network) operator does not control the location and/or operation of the cell. Other cells are controlled in the sense that the operator does control the both the location and operation of the cells. Examples of uncontrolled cells include, for example, CSG (closed subscriber group) cells, cells controlled by home enode b's and home node b's. These cells are also sometimes referred to as being "uncoordinated" in the sense that they are not subject to normal radio/cell planning.

It is generally understood that there are many methods of performing a handover for controlled cells. Inbound handover in this context refers to a cell change from a target cell's perspective where resources (for example timeslots, frequency channels, scrambling codes, etc.) for transmission and/or reception in the cell are allocated to a mobile station in advance of the mobile station performing a cell change to that cell, particularly in response to a request from the controller of the device's serving cell.

While the uncontrolled cells may be configured to use spectrum that is owned by the operator, the network operator does not have the same control over uncontrolled cells as for controlled cells. Typically, the network operator does not own the support structure (towers etc.), does not own or control the backhaul connection (e.g. Digital Subscriber Line (DSL) connections), does not know or control when a given uncontrolled cell is going to be switched on, and may not know or control the locations of uncontrolled cells. The operator will typically still have control of various parameters such as operating frequency, transmit power, etc. if the operator owns the spectrum license.

In order to perform a handover to a target cell, controlled or uncontrolled, a MS (mobile station) typically needs to provide identifying information relating to the target cell to the current serving cell so that it can initiate a handover process. In particular, the current serving cell needs to be able to communicate with (possibly via a core network) the cell controller for the target cell. However, the current serving cell may not be aware of how to reach the cell controller for the target cell, particularly if the target cell is an uncontrolled cell, unless provided with explicit identification information for the cell (such as a cell global identity). This makes handover to such cells difficult. In contrast, for a controlled target cell, it may be sufficient for the mobile station to provide the current serving cell with information about the target cell. This does not require or cause the acquisition of any broadcast information from the target controlled cell for the serving cell to be able to reach the cell controller for the target controlled cell, since the serving cell or some part of the network may be able to map other identifying features of the cell (such as operating frequency, scrambling code etc.) to the identity of the target cell or its controller.

A cell controller may not necessarily map physical layer identities (such as frequency, spreading code, etc.) of an uncontrolled cell (more generally, another cell) to the identity of its respective controller (or to an identifier which can be used elsewhere in the core network to route messages to the target controller).

Figure 3:
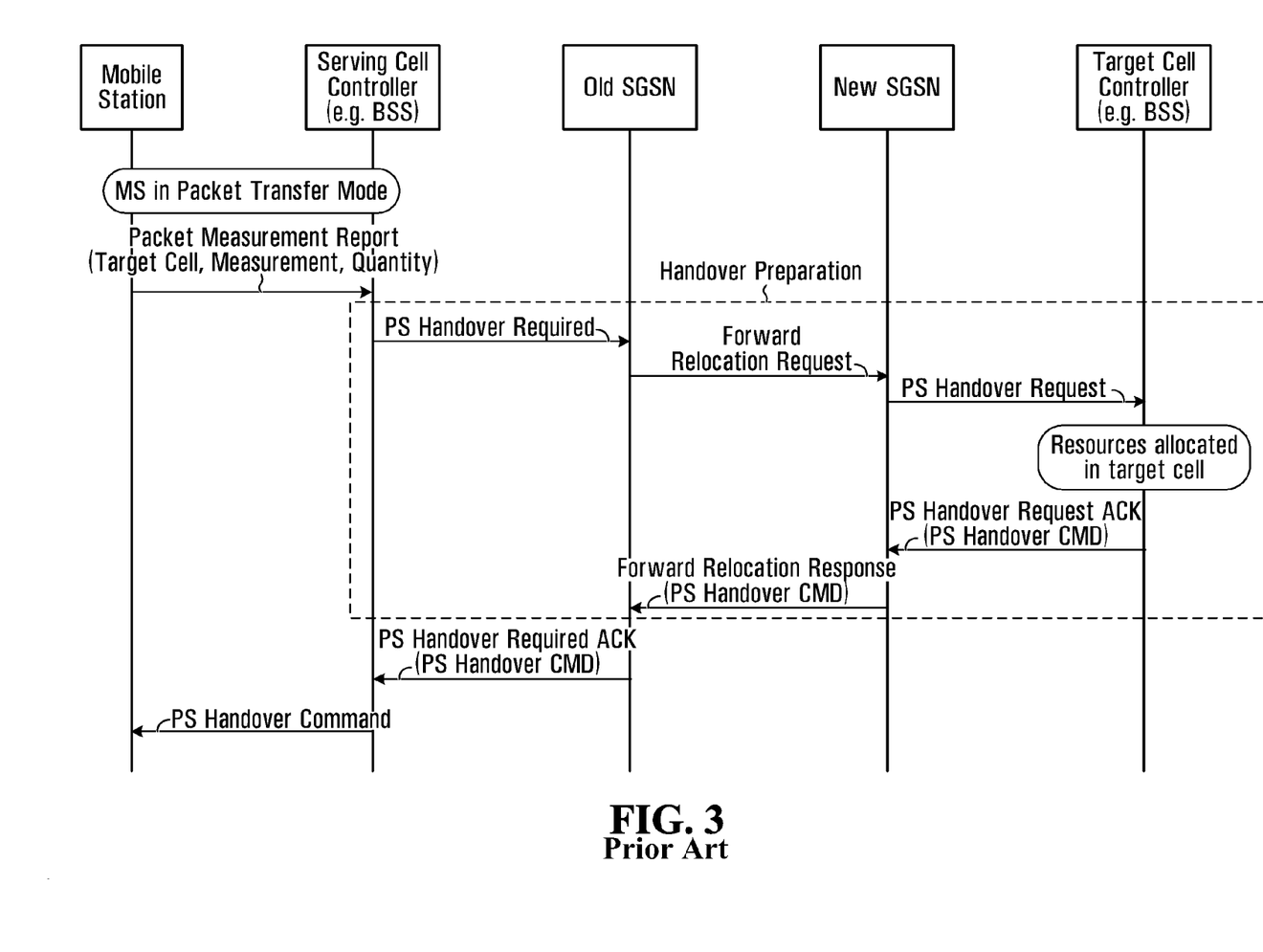
FIG. 3 shows a messaging sequence for a conventional handover.

An example handover procedure, including a handover preparation phase, for controlled cells is shown in FIG. 3. The PS (packet switched) Handover Command (also "PS Handover CMD" in FIG. 1) is constructed at the target cell controller based on the resources allocated during the preparation phase, and is transferred transparently via the core network and serving cell controller to the mobile station.

As part of a handover preparation, messages need to be routed from the serving cell controller to the target cell controller. In some implementations, handover is triggered in response to a measurement report, PCCN (packet cell change notification) or similar message received from the MS (mobile station). These messages identify target cells only by their physical layer identities and even this may be indirect, e.g. by means of an index into a list of such identities. These physical layer identities are not globally unique, but may be unique for a given serving cell, i.e. the tuple <target cell physical layer identity, serving cell> is typically unique for target cells that are controlled cells.

For handover to controlled cells, typically serving cell controllers are configured with sufficient information to allow messages to be routed to the appropriate target cell controller. For example, this may be by means of a mapping table of <target cell physical layer identity>→<target cell global ID>, where the target cell global ID can be used to route messages within the core network to the appropriate cell controller. Alternatively, the mapping may be stored at some node other than the serving cell controller, e.g. a core network node such as an MSC (mobile switching centre) or SGSN (serving GPRS support node).

Alternatively, the serving cell controller may be configured to know that it is also the controller of the target cell. Traditionally, this situation might be quite common, as cell controllers are organized (broadly) in geographical arrangement (i.e. many cells in a geographic locality will be controlled by the same controller). However, considering that there are now multiple different radio access technologies (with corresponding different controllers) with overlapping coverage and that new cell controllers (particularly for uncontrolled cells) are less likely to control multiple cells, this scenario becomes less common. If the cell controller is the same for both old cell and target cells, then the cell controller knows if it is able to complete the handover. The possibility of two distinct controllers adds more complexity.

If a target cell controller does not support handover (more generally if handover is not supported in respect of the target cell), the preparation phase will fail. The target cell controller may in this case indicate an appropriate cause, for example "PS Handover not Supported in Target BSS or Target system" (see 3GPP TS 48.018 sub-clause 11.3.8, covering handovers towards a GSM/GPRS/EDGE cell). To avoid repeated failed handover attempts to controlled cells, cell controllers may store information about the possibility to complete a handover towards particular controlled target cells.

Currently, cell change while in "dedicated mode" of the GERAN RAT (radio access technology), or more generally in a corresponding mode in another RAT (for example a mode during which a circuit-switched connection, such as a voice call, is ongoing) requires a preparation phase to ensure resources are available in the target cell. The preparation phase may for example include one or more of:

a request for handover sent from a serving cell controller (see for example, 3.1.5.1.1 in 3GPP TS 48.008) which is forwarded to a target cell controller (see 3GPP TS 23.009, section 6.1);

allocation of resources by the target cell controller in the target cell (for example as described in 3.1.5.2 of 3GPP TS 48.008); and generation of a message identifying the reserved resources in the target cell (as described in, for example, 3.1.5.2.1 in 3GPP TS 48.008).

BRIEF DESCRIPTION OF THE DRAWINGS

Embodiments of the application will now be described with reference to the attached drawings in which.

DETAILED DESCRIPTION

It should be understood at the outset that although illustrative implementations of one or more embodiments of the present disclosure are provided below, the disclosed systems and/or methods may be implemented using any number of techniques, whether or not currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the description that follows, cell controller is a generic term which could, for example, refer to base station controllers (BSC), radio network controllers (RNC) or eNodeB (eNB) or Home eNodeB; generally for the purpose of this description, it is used to mean an entity which controls the cell in some sense. For example, a cell controller might be an entity which initiates a handover preparation procedure for a mobile station ("serving cell controller") or which allocates resources in a target cell as part of a handover procedure ("target cell controller"). The serving cell controller may, for example, be responsible for processing measurement reports, cell change notifications and similar messages received from a mobile station and based on these (and other implementation-specific considerations) generating mobility commands (such as packet cell change order messages) to be transmitted to the mobile station and/or initiating handover preparation. A GERAN BSS is an example. The same entity or entities may function as a serving cell controller in respect of the cell when performing a serving cell role and a target cell controller when the same cell is performing a target cell role. A cell controller may perform the control function for one or multiple cells. In some cases, a cell controller performs the control function for one cell and is co-located with other cell components, such as a component containing a wireless transceiver, such as a base station. A cell controller may be a part of a BSS (base station subsystem) which includes the transceiver. References to a cell sending or receiving something refer to a wireless transceiver sending or receiving something, possibly under control of the cell controller of the cell.

Figure 1:
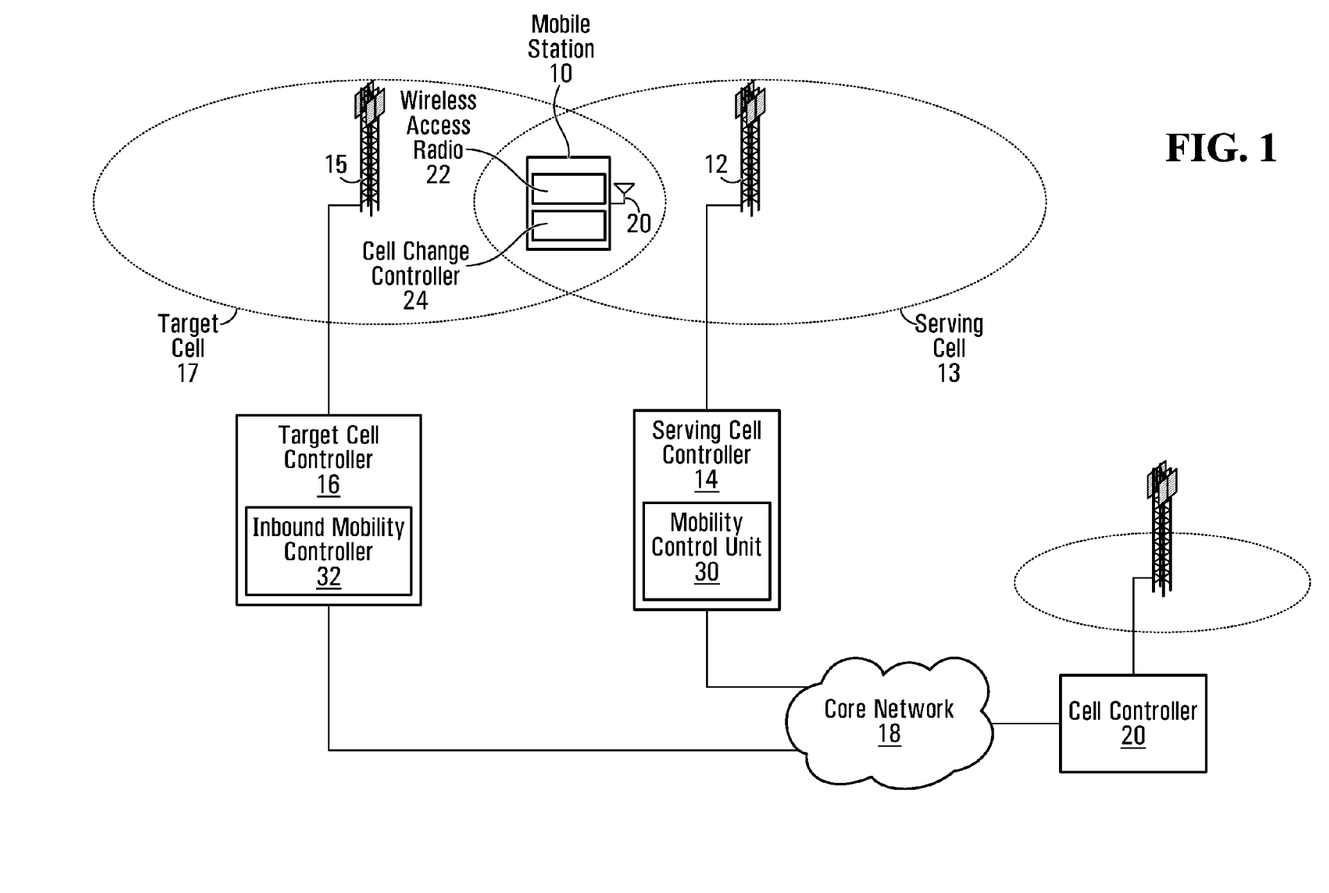
FIG. 1 is a schematic diagram of a mobile station, serving cell and target cell.
Figure 2:
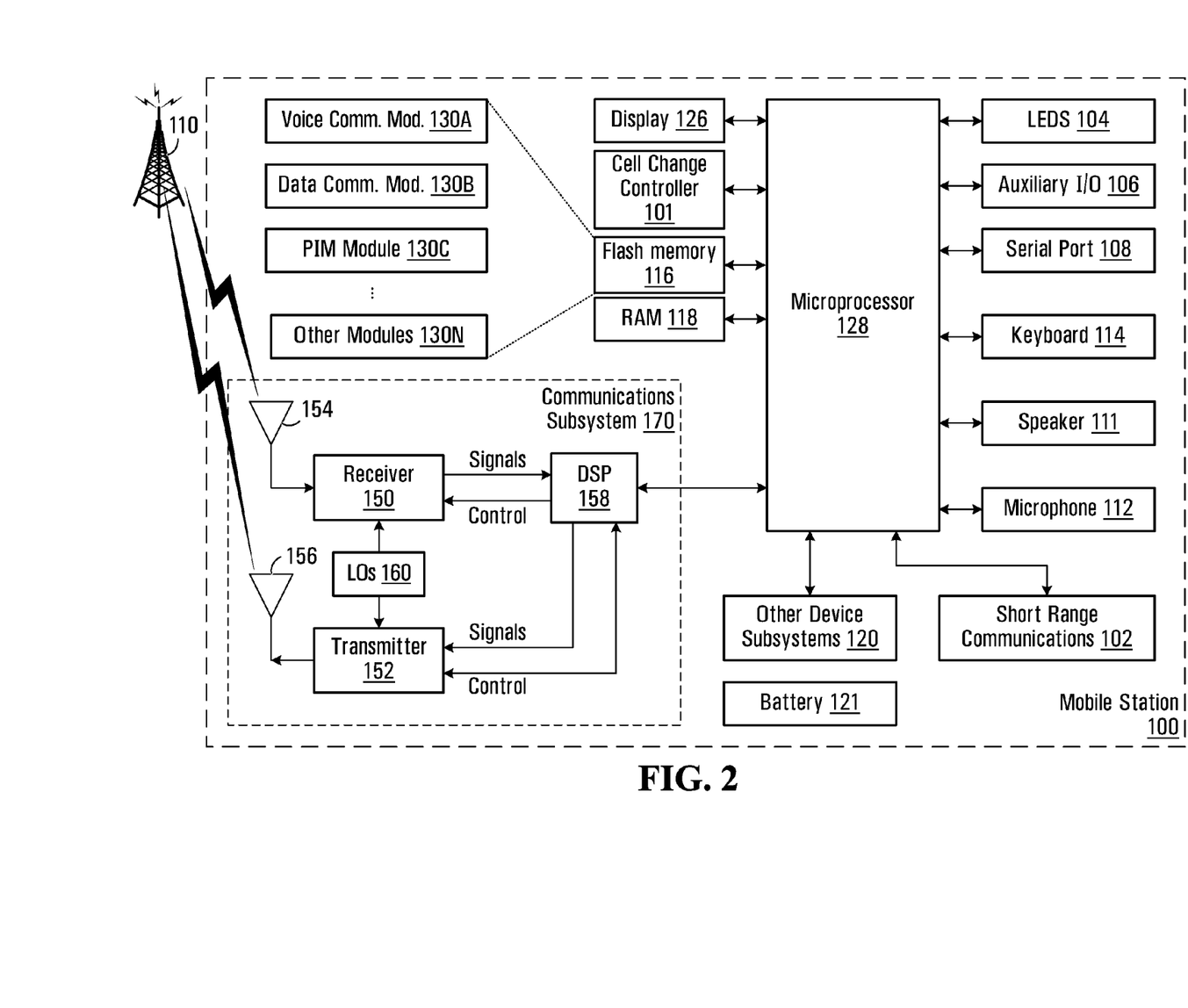
FIG. 2 is a block diagram of a mobile station.

Referring to FIG. 1, shown is a schematic diagram in which a mobile station 10 has a wireless connection to a serving cell transceiver 12 within serving cell 13. Also shown is a serving cell controller 14, target cell transceiver 15 within target cell 17, and target cell controller 16. Of course, other network elements may be present, such as core network elements 18 and other cell controllers 20. The core network elements may, for example, include one or more of an SGSN (serving GPRS support node), MSC (mobile switching centre), MME (mobility management entity). The signaling over the air interface (between a transceiver and a mobile station) is typically performed at the RLC (radio link control)/MAC (medium access control) layer. Signaling between a BSS and core network is separate from RLC/MAC.

The serving cell controller 14 is configured with a mobility control unit 30 that enables the serving cell controller to perform one or a combination of two or more of the serving cell controller methods described herein. The mobility control unit 30 may be implemented in hardware, or software running on a processing platform such as a processor or combination of processors, or a combination of hardware and software. The mobility control unit 30 may be implemented as part of/a change to another component forming part of a serving cell controller. The serving cell controller 14 includes other components (not shown) to allow it to perform the serving cell controller functionality.

The target cell controller 16 is configured with an inbound mobility controller 32 that enables the target cell controller to perform one or a combination of two or more of the target cell controller methods described herein. The inbound mobility controller 32 may be implemented in hardware, or software running on a processing platform such as a processor or combination of processors, or a combination of hardware and software. The inbound mobility controller 32 may be implemented as part of/a change to another component forming part of a target cell controller. The target cell controller 16 includes other components (not shown) to allow it to perform the target cell controller functionality.

A cell controller may be implemented that includes both the mobility control unit 30 and the inbound mobility controller 32.

The mobile station 10 has at least one antenna 20, and at least one wireless access radio 22. In addition, them mobile station is configured with a cell change controller 24 that enables the mobile station to perform one or a combination of two or more of the mobile station methods described herein. The cell change controller 24 may be implemented in hardware, or software running on a processing platform such as a processor or combination of processors, or a combination of hardware and software. The cell change controller 24 may be implemented as part of/a change to another component forming part of a mobile station. The mobile station 10 includes other components (not shown) to allow it to perform mobile station functionality.

Various embodiments that comprise methods implemented by a mobile station or cell controller will now be described with reference to FIGS. 5 and 6. For each method, unless clearly necessary for the method to function, it is not necessary that the steps be executed in the sequence depicted or described.

Figure 5:
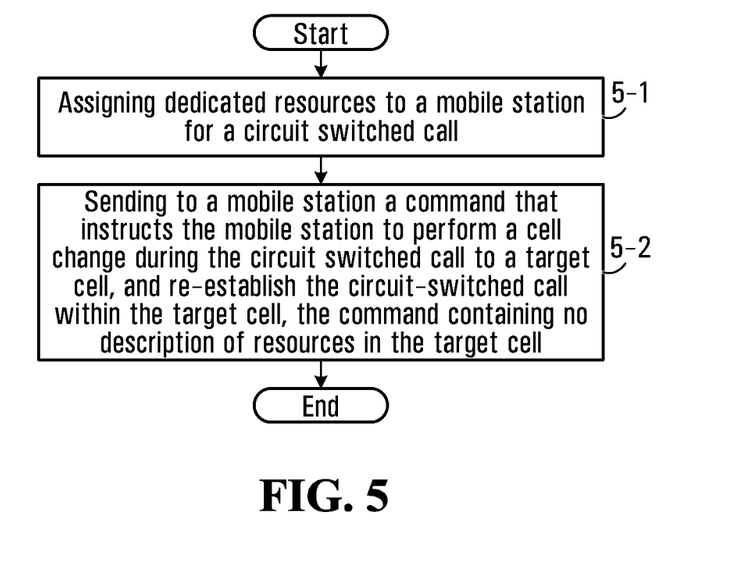
FIGS. 5 and 6 are flowcharts of methods for execution by a mobile station or cell controller.

FIG. 5 is a flowchart of a method for execution in a network. The method involves assigning dedicated resources to a mobile station for a circuit switched call (5-1). This may occur in the serving cell at call origination if the call originated in the serving cell, or may occur in respect of a pre-existing circuit-switched call when the mobile station moved into the current cell. The method continues with sending to a mobile station a command that instructs the mobile station to, or indicates that the mobile station should, perform a cell change during the circuit switched call to a target cell, and re-establish the circuit-switched call within the target cell, the command containing no description of resources in the target cell (5-2).

In some embodiments, the command is generated by a serving cell controller while in other embodiments, the command is a cell change response command generated by a target cell controller.

Figure 6:
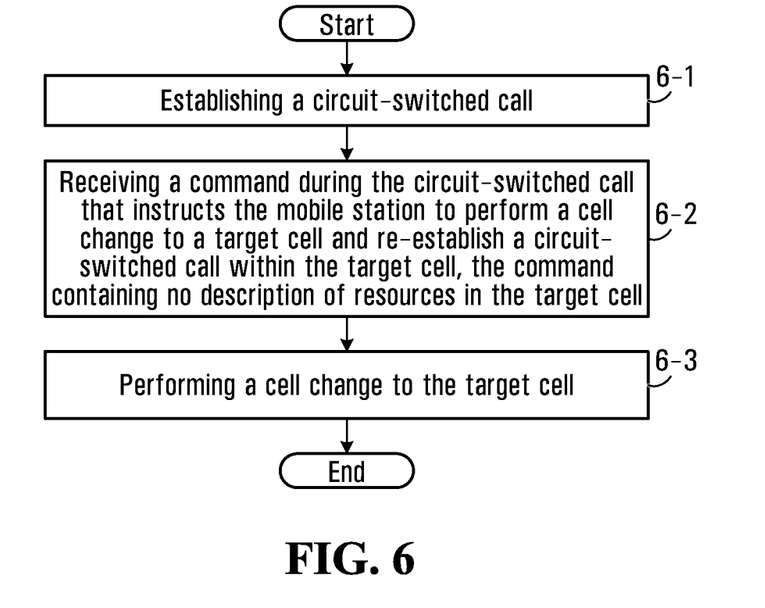

FIG. 6 is a flowchart of a method for execution by a mobile station. The method involves establishing a circuit-switched call (6-1); receiving a command during the circuit-switched call that instructs the mobile station to perform a cell change to a target cell and re-establish a circuit-switched call within the target cell, the command containing no description of resources in the target cell (6-2); performing a cell change to the target cell (6-3).

Further embodiments provide computer readable media having computer executable instructions stored thereon, that when executed by an appropriate processing device, such as a mobile device or a cell controller, execute any one or more of the methods described herein.

Command for Simplified Handover with Call Re-Establishment

A method is provided that allows a network to control cell change by a mobile station currently in dedicated mode in somewhat of a "handover-like" manner, without requiring a preparation phase. The methods are handover-like in the sense that they are network controlled, specifically, under control of the serving cell controller. They do differ from full handover in that resources in the target cell are not described to the mobile station in advance of the mobile station connecting to the target cell.

The embodiments described herein assume a mobile station is in dedicated mode, but more generally, these methods are applicable for a mobile station that has an ongoing circuit-switched call such as, but not necessarily, voice or is in a mode where cell change requires resources to be reserved in the target cell and a description of these resources to be provided to the mobile station in advance of the cell change. In some embodiments, the method is applied specifically to uncontrolled cells. More generally, the method is applicable to any cell type, not just uncontrolled cells.

Figure 4:
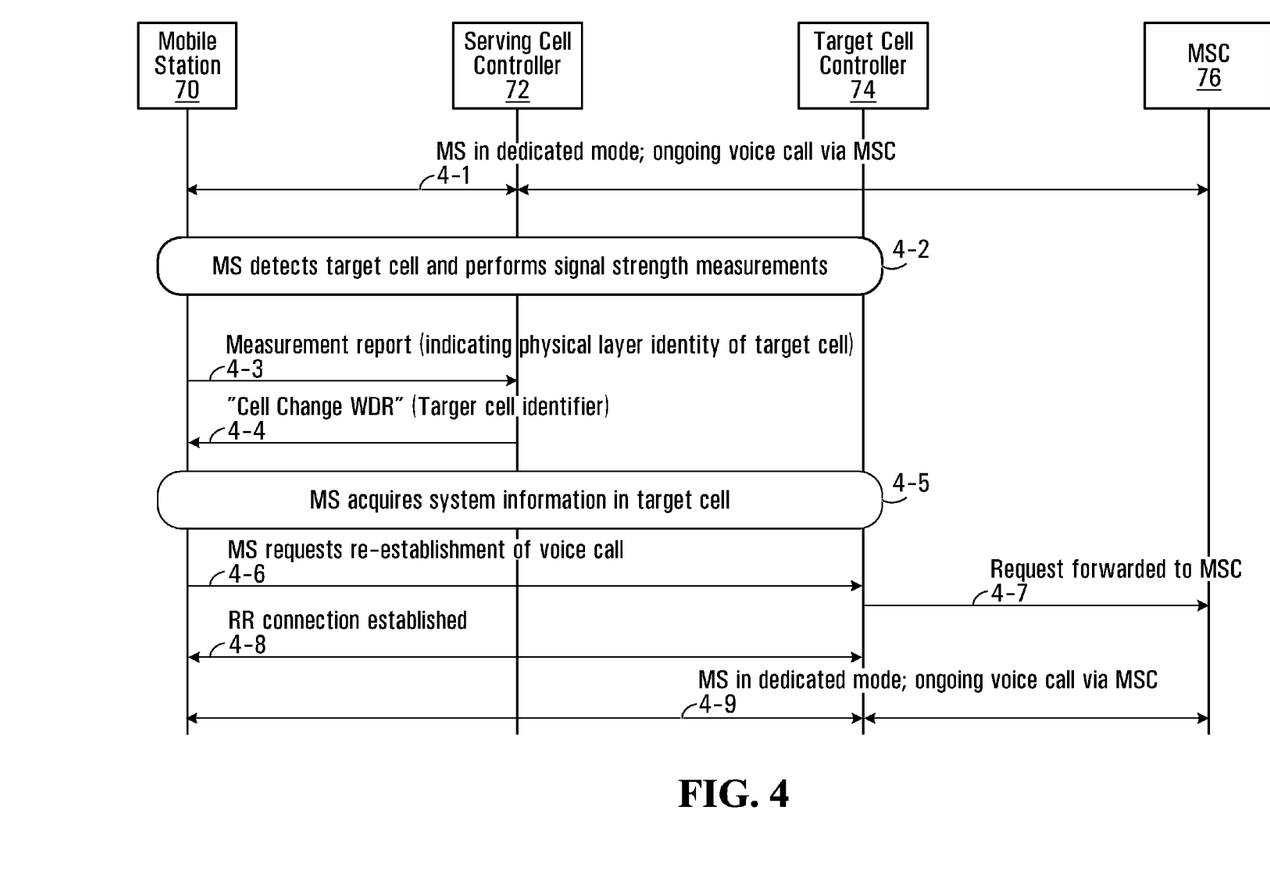
FIG. 4 shows a messaging sequence for a cell change for a circuit-switched call that does not involve providing a description of resources in the target cell in advance of the cell change.

An example of such a procedure is illustrated in FIG. 4. Various exchanges are depicted between a mobile station 70, a serving cell controller 72, a target cell controller 74, and an MSC (mobile switching centre) 76. At 4-1, the MS is in dedicated mode, and has an ongoing voice call. MSC 76 is the MSC for the mobile station 10 during this time. At 4-2, the MS detects a target cell and performs signal strength measurements. At substantially the same time, the MS also detects part or all of the physical layer identity of the target call. At 4-3, the measurement report is sent to the serving cell controller 72. This contains an indication of a physical layer identity of the target cell. At 4-4, the serving cell controller 72 sends a command for cell change without description of resources in target call, "cell change WDR" in FIG. 4, that contains a target cell identifier to the mobile station 70. At 4-5, the MS acquires system information in the target cell. At 4-6, the MS requests re-establishment of the voice call to the target cell controller 74. At 4-7, the request is forwarded by the target cell controller 74 to the MSC 76. At 4-8, RR (radio resource) connection establishment occurs. At 4-9, the MS 70 is in dedicated mode. MSC 76 is the MSC for the mobile station 10 at this time. The MSC 76 is typically the same after the cell change, as depicted; in some cases, it may be a different MSC. Respecting block 4-2, in some implementations, the mobile station may know some of the physical layer identity, e.g. the carrier frequency in advance. The signal strength measurement and determination of the complete physical layer identity are performed substantially simultaneously in some systems. For example, for CDMA systems, the mobile station may perform a search to find a cell's spreading code; or, for GSM (frequency multiplexed), the mobile station may tune to the cell (which requires the mobile station to know at least some of its physical layer identity) and then measures signal strength.

In some circumstances, block 4-2 may be achieved without any interruption to service. This can be achieved, for example, by scheduling measurements to be performed within measurement gaps or "idle" frames, when no data is transferred within the source cell; this is substantially unnoticeable to the user. Note that in contrast, in the conventional full handover approach, SI (system information) reading may be required in advance of sending a handover command, particularly in respect of target cells which are uncontrolled cells. If SI reading is required, it is not always possible to schedule measurement and detection of target cells during gaps/idle frames. Rather, this may require a significant duration during which the mobile station cannot transmit or receive in the serving cell. These gaps may be coordinated by the network (so that, for example, the network does not send data during these gaps) or not (the MS simply autonomously is not tuned to the serving cell for a significant period of time e.g. 80 ms or more, during which data may continue to be transmitted to the MS in the serving cell); the "or not" case is particularly relevant for voice, because voice data would not normally be retransmitted later.

In some embodiments, the command for cell change without description of resources in target call is based on a modification to an existing handover command that is otherwise used for handover with a description of resources allocated in the target cell. A detailed example of such a command is given below. Alternatively, it may be a completely new message. In GSM voice, the command for cell change without description of resources in target call may be sent on the "main DCCH" (dedicated control channel), which is usually the "FACCH" fast associated control channel, associated with the voice resource (timeslot).

Steps 4-4, 4-6, -7 do not form part of existing handover procedures defined for controlled cells. The remaining steps may be omitted/performed out of order; additional steps that may or may not be based on existing procedures (e.g. transport layer connection establishment between target cell controller and MSC) may be included. In some embodiments, step 4-4 may be triggered by one or a combination of a measurement report, proximity indication or anything else (or nothing).

In some embodiments, if the target cell is a uncontrolled cell, the serving cell controller sends the command for cell change without description of resources in target call only if it is informed (e.g. as part of the measurement report) that the mobile station has determined that it is permitted to access the target cell. For example, the mobile station may maintain a whitelist of CSGs to which the mobile station is permitted access, and the mobile station can determine whether it is permitted access to a given CSG cell on the basis of the whitelist.

Call re-establishment refers to steps taken to continue an existing circuit-switched call, as opposed to establishing a completely new call. There are existing call re-establishment procedures that have been defined for execution in certain circumstances when radio link failure has occurred. An example of call re-establishment for GSM and UTRAN is defined in 3GPP TS 24.008. These procedures provide for various messaging capabilities to allow call re-establishment after call failure to occur. The embodiment described above may employ the existing signaling applicable to deal with call failure for call re-establishment in the context of cell reselection when call failure has not in fact occurred. This has the potential benefit that call re-establishment may be more likely to be supported in the target cell than handover. More generally, any signaling approach may be employed to order the mobile station to perform a cell change while in a dedicated or similar mode without performing the preparation phase and re-establish a circuit-switched call in the target cell. The signaling approach used may be based on existing signaling such as the call re-establishment signaling defined to deal with call failure, or may be completely new.

In some embodiments, existing solutions can be used to ensure that at step 4-7, the request is forwarded to the correct MSC: specifically, the NRI (network resource identifier, which identifies an MSC/SGSN) may be included within the mobile station's (temporary) identity (see 3GPP TS 23.236) which is provided to the cell controller.

Advantageously, with the approach described, the network maintains control over mobility, signaling may be reduced as there is no need to send any SI data to the serving cell; cell changes may occur sooner as there is no need to wait for SI acquisition, reporting SI to serving cell controller, or handover preparation phase.

The described approach may be beneficial in various circumstances. A first example of where this may be beneficial is where the target cell is known not to support inbound handover. A second example of where this may be beneficial is where it is not known whether the target cell supports inbound handover and the preparation may therefore fail. A third example of where this may be beneficial is where the radio conditions applicable to the mobile station are deteriorating rapidly and the serving cell wishes to trigger cell change without incurring the delay of a full handover preparation procedure. Also, this approach may avoid the serving cell controller having to use or support additional signaling associated with handover to controlled cells.

Mechanisms Using Handover Command with No Resources Indicated

In another embodiment, a cell change response command is constructed by the target cell controller and is forwarded to the mobile station transparently via the serving cell, and the cell change response command does not contain any allocation of resources in the target cell. The cell change response command is a response in the sense that it is generated in response to a cell change indication (e.g. HANDOVER REQUIRED message see 3GPP TS 48.008) sent by a serving cell controller. An example of a sequence leading to this response is a serving cell controller sending a message indicating that a handover is required to a MSC, the MSC sending a handover request to the target cell controller, and the target cell controller sending a cell change response, to the mobile station transparently via the MSC and serving cell controller. In some embodiments, the cell change response command is based on an existing handover command in the sense that in the situation where inbound handover in respect of the target cell is supported, through settings of at least part of the contents of the command to be a first set of contents, the command is a command for handover in the normal sense with resources being allocated in the target cell and described to the mobile station in advance of the cell change. However, by setting at least part of the contents to be a second set of contents, the command functions to indicate to the mobile station that no resources have been allocated in the target cell. Alternatively, the cell change response command may be completely new. This approach may be applied to target cells that are uncontrolled cells, but more generally can be applied to any target cell type. This solution may, for example, be employed in a case where the serving cell controller initiates a handover preparation phase but the target cell controller does not support full handover functionality. This scenario may arise for example, if the serving cell controller does not know whether the target cell supports inbound handover.

In some embodiments, the cell change response command may include an indication to perform cell reselection and that no resources are allocated. Such a command is an instruction to the mobile station to perform the cell change by moving to idle mode in the new cell, and to perform cell access from idle mode. For example, the cell change response command may contain a field having a first state that instructs the mobile station to perform reselection to the new cell even though no resources are described in the handover command (for example, because no resources have been reserved in the target cell, or because resources have been reserved but are not described), the field having a second state distinct from the first state. The RESEL field described in the detailed example below is a specific example. References to idle mode refer, for example, to a mode in which a mobile station has not received (and is not using) an assignment of resources to be used for data (inc. voice) transmission or reception in the cell.

In some embodiments, the cell change response command may include an indication that inbound handover in respect of the target cell is not supported. The indication may indicate PS-handover, CS-handover, PS+CS (DTM) handover, or all types. This indication is included depending on the support of the corresponding features by the target cell controller. The HO support field described in the detailed example below is a specific example.

In some embodiments, the cell change response command may include a reference number to allow the MS to identify itself in the target cell quickly. The reference number may, for example, be a random number allocated by the target cell controller.

In some embodiments, the target cell controller may construct a cell change response command containing from zero to any one or more of the indications described above. Handover capability may, for example, be based on the feature support for the corresponding cell and/or the capability of the target cell controller. A detailed example is given below for the case where the target cell is a GSM cell. Corresponding functionality can be implemented for UMTS/E-UTRAN target cells.

Mobile Station Response to the Cell Change Response Command

The cell change response command with zero or more of the indications is sent by the target cell controller to the mobile station through the serving cell.

The mobile station behaves differently depending upon what indication(s) are received in the cell change response command.

Cell Change Response Command Indicates "Perform Reselection; No Resources Allocated"

In the event the cell change response command indicates to the mobile station to perform reselection and no resources allocated, the mobile station performs the cell change, moves to idle mode in the new cell, and performs cell access from idle mode, for example using the call re-establishment procedure based approach described above.

If the reference number is provided, the mobile station provides this to the target cell controller at (or soon after) initial access in the target cell; in this case, the mobile station may omit sending capability information (since the target controller will have received this as part of the handover preparation phase).

Cell Change Response Command Does not Indicate "Perform Reselection, No Resources Allocated"

In a first option, when the cell change response command does not contain an indication to perform reselection, no resources allocated, a cell change is performed, for example together with the call re-establishment based procedure described above. In a second option, when the cell change response command does not contain an indication to perform reselection, no resources allocated, the MS stays in the serving cell and sends a Handover Failure message indicating "no resources are available" in the target cell.

In some embodiments, one or both of the two above-discussed options are available. Which of these two options to apply may be standardized, signaled as a policy by the network (e.g. in system information), or additionally signaled in the cell change response command constructed by the target cell controller, or be determined by the mobile station (for example, in an implementation-specific manner).

Subsequent Network Behaviour

In some embodiments, if the MS does subsequently access the target cell, the target cell controller sends a Handover Complete to the MSC (or more generally send a similar message to the appropriate core network node) to indicate that the MS has completed the cell change.

In some embodiments, if the MS remains in the serving cell (including where it unsuccessfully attempted to access the target cell and returned to the serving cell), the network (on response of the appropriate failure message from the mobile) behaves as per existing procedures for this scenario. Note that one of the benefits of this solution is that serving cell behaviour is not necessarily changed hence there is not necessarily any impact on serving cell controllers.

The provided approaches may provide much of the functionality of handover, with reduced implementation on target cell controllers in the sense that they do not require handover access detection, resource pre-allocation, or the capability to describe pre-allocated resources in a handover command. The approaches may allow a MS to become aware that handover is not fully supported in the target cell. The approaches do not necessarily impact the serving cell controller. The handover command may be shorter than if resources are allocated. This may make for faster/more reliable transmission in the serving cell. Finally, the approaches allow for core network coordination of cell change (e.g. in case serving MSC/SGSN changes).

Detailed Example

The following is an example of a handover procedure, shown in terms of changes to 3GPP TS 44.018 v.9.3.0. In this example, the above-referenced cell change response command is implemented as a modified version of an existing handover command.

3.4.4 Handover Procedure
3.4.4.1 Handover Initiation
The network initiates the handover procedure by sending a HANDOVER COMMAND message to the mobile station on the main DCCH. It then starts timer T3103.

If the HANDOVER COMMAND message refers to a cell to which the mobile station is not synchronized to, this shall not be considered as an error (see 3GPP TS 45.008).

NOTE: The network should take into account limitations of certain mobile stations to understand formats used in the Frequency List IE, Frequency Short List IE, and Cell Channel Description IE used in the HANDOVER COMMAND message, see sub-clause 10.5.2.13, sub-clause 10.5.2.14, and sub-clause 10.5.2.1b.

When sending this message on the network side, and when receiving it on the mobile station side, all transmission of signaling layer messages except for those RR messages needed for this procedure and for abnormal cases, is suspended until resuming is indicated. These RR messages can be deduced from sub-clauses 3.4.3 and 8.5.1 "Radio Resource management".

Upon receipt of a HANDOVER COMMAND message which describes reserved resources in the target cell, the mobile station initiates, as described in sub-clause 3.1.4, the release of link layer connections, disconnects the physical channels (including the packet resources, if in class A mode of operation), commands the switching to the assigned channels and initiates the establishment of lower layer connections (this includes the activation of the channels, their connection and the establishment of the data links).

Upon receipt of a HANDOVER COMMAND message which does not describe reserved resources in the target cell, and where the RESEL bit is set to '1' (see sub-clause 10.5.2.76), the mobile station performs as specified above, except that access to the new cell is from idle mode using the procedure for call re-establishment.

Upon receipt of a HANDOVER COMMAND message which does not describe reserved resources in the target cell, where the RESEL bit is set to '0' (see sub-clause 10.5.2.76), and which indicates that CS Handover (or, in the case of DIM Handover, DIM Handover) is not supported, the mobile station remains in the current cell and transmits a HANDOVER FAILURE message on the main DCCH with cause "Handover not supported by target cell".

Upon receipt of a HANDOVER COMMAND message which does not describe reserved resources in the target cell, where the RESEL bit is set to '0' (see sub-clause 10.5.2.76), and which indicates that CS Handover (or, in the case of DIM Handover, DIM Handover) is supported, the mobile station remains in the current cell and transmits a HANDOVER FAILURE message on the main DCCH with cause "No resources in the target cell".

The HANDOVER COMMAND message contains:

The characteristics of the new channels, including for the multislot configuration and the ICH/H+ICH/H+ACCHs configuration the exact ACCHs to be used. The message may also contain definitions of the channel mode to be applied for one or several channel sets. If a previously undefined channel set is defined by the HANDOVER COMMAND message, a definition of the channel mode for the new channel set shall be included in the message. This may be omitted if the Short Handover Options IE is present and indicates that the mobile station shall perform cell change and no reserved resources are described in the HANDOVER COMMAND.

The characteristics of the new cell that are necessary to successfully communicate (e.g. frequency list in the case of slow frequency hopping), including the data that allows the mobile station to use the pre-knowledge about synchronization it acquires by the measurement process (i.e. BSIC+ BCCH frequency).

Optionally, a_power command (cf. 3GPP TS 45.008). The power level defined in this power command shall be used by the mobile station for the initial power on the new channel(s). It shall not affect the power used on the old channel(s).

Optionally, an indication of the physical channel establishment procedure to be used.

A handover reference, used as specified in the following sub-clause. The choice of the handover reference by the network is out of the scope of this specification and left to the manufacturers.

3.4.4.2 Physical Channel Establishment
Four procedures are defined. The support of three of them is mandatory in the mobile station. The pseudo-synchronization case is optional in the mobile station. A pseudo-synchronized handover can be commanded only to a mobile station that can support it, as indicated in the classmark.
As an alternative to these procedures, the mobile station shall perform channel establishment by means of the call re-establishment procedure if indicated in the previous sub-clause.
The following is an example of a handover command implemented as changes to 3GPP TS 44.018 v.9.3.0.
9.1.15 Handover Command
This message is sent on the main DCCH by the network to the mobile station to change the dedicated channel configuration, timing adjustment needed. See table 9.1.15.1.
　　Message type: HANDOVER COMMAND
　　Significance: dual
　　Direction: network to mobile station 9.1.15.17 Short Handover Options
If this IE is present and indicates "Perform reselection—no resources allocated", then mobile station shall ignore the "Description of the first channel, after time" and any other optional or conditional IEs included in the message.

10.5.2.76 Short Handover Options
The Short Handover Options information element is coded as shown in figure 10.5.2.76.1 and table 10.5.2.76.1.

| 8 | 7 | 6 | 5 | 4 | 3 | 2 | 1 | |
|---|---|---|---|---|---|---|---|---|
| Short Handover Options IEI ||||||||  octet 1 |
| Length of Short Handover Options |||||||| octet 2 |
| RESEL | HO_Support ||| Spare |||| octet 3 |

Figure 10.5.2.76.1 Short Handover Options

TABLE 10.5.2.76.1

Short Handover Options information element details

RESEL (1 bit field)
If this bit is set to '1', then the mobile station shall perform reselection to the new cell, even though no resources have been reserved in the target cell (or, no valid resources are described in the Handover Command).
If this bit is set to '1', then the support of call re-establishment is supported for the purposes of re-establishing the voice call after the ordered cell change.
HO_Support (3 bit field)

TABLE 9.1.15.1

HANDOVER COMMAND message content

| IEI | Information element | Type/Reference | Presence | Format | length |
|---|---|---|---|---|---|
| | RR management Protocol Discriminator | Protocol Discriminator 10.2 | M | V | ½ |
| | Skip Indicator | Skip Indicator 10.3.1 | M | V | ½ |
| | Handover Command Message Type | Message Type 10.4 | M | V | 1 |
| | Cell Description | Cell description 10.5.2.2 | M | V | 2 |
| | Description of the first channel, after time | Channel Description 2 10.5.2.5a | M | V | 3 |
| | Handover Reference | Handover Reference 10.5.2.15 | M | V | 1 |
| | Power Command and Access type | Power Command and Access type 10.5.2.28a | M | V | 1 |
| D- | Synchronization Indication | Synchronization Indication 10.5.2.39 | O | TV | 1 |
| 02 | Frequency Short List, after time | Frequency Short List 10.5.2.14 | C | TV | 10 |
| 05 | Frequency List, after time | Frequency List 10.5.2.13 | C | TLV | 4-131 |
| 62 | Cell Channel Description | Cell Channel Description 10.5.2.1b | C | TV | 17 |
| 10 | Description of the multislot configuration | Multislot Allocation 10.5.2.21b | C | TLV | 3-12 |
| 63 | Mode of the First Channel(Channel Set 1)) | Channel Mode 10.5.2.6 | O | TV | 2 |
| 22 | Short Handover Options | Short Handover Options 10.5.2.76 | O | TLV | 3 |

TABLE 10.5.2.76.1-continued

Short Handover Options information element details

If a bit in this field is set to '1', the corresponding handover towards the target is supported. If set to '0', it is not possible to perform that handover procedure towards the target cell.

Bit

7   CS handover
6   PS Handover
5   DTM Handover The described embodiments contain references to messages that contain no description of resources in the target cell, be they allocated or assigned for example. In other embodiments, the message contains substantially no description of resources in the target cell.

Some of the embodiments described can be implemented in the context of one or more of the following standards, all of which are incorporated by reference in their entirety:

3GPP 15 44.060 (latest version is v.9.2.0) "General Packet Radio Service (GPRS); Mobile Station (MS)—Base Station System (BSS) interface; Radio Link Control/Medium Access Control (RLC/MAC) protocol".

3GPP 15 45.008: "Radio subsystem link control". (latest version is v.9.1.0)

3GPP 15 44.018 "Mobile radio interface; Layer 3 specification; Radio Resource Control Protocol". (latest version is 9.3.0)

3GPP 15 48.008 "Mobile Switching Centre—Base Station System (MSC-BSS) interface; Layer 3 specification" (latest version is 9.1.0)

3GPP 15 43.129 Packed-switched handover for GERAN A/Gb mode; Stage 2 (defines Handover Preparation; latest version is 9.0.0)

3GPP 15 48.018 "General Packet Radio Service (GPRS); Base Station System (BSS)—Serving GPRS Support Node (SGSN); BSS GPRS protocol (BSSGP)" (more PS Handover stuff; latest version is 9.0.0)

Numerous modifications and variations of the present application are possible in light of the above teachings. It is therefore to be understood that within the scope of the appended claims, the application may be practiced otherwise than as specifically described herein.

The invention claimed is:

1. A method comprising:
   assigning dedicated resources of a serving cell to a mobile station for a circuit switched call; and
   sending to the mobile station a command that instructs the mobile station to perform a cell change during the circuit switched call to an identified target cell and that instructs the mobile station to re-establish the circuit-switched call within the identified target cell without performing a preparation phase reserving target cell resources needed for re-establishing the circuit switched call within the identified target cell, the command containing no description of resources for the circuit switched call in the identified target cell.

2. The method of claim 1 wherein the command instructs the mobile station to use call re-establishment signaling.

3. The method of claim 1 wherein the command is sent upon determining at least one of:
   that target cell does not support inbound handover;
   that it is not known whether the target cell supports inbound handover; and
   that radio conditions have deteriorated, and the serving cell is configured to trigger the cell change without incurring a delay associated with signaling to reserve resources in the target cell.

4. The method of claim 1 wherein the command is generated by a controller of the serving cell of the mobile station.

5. The method of claim 1 wherein the command is a first cell change response command generated by a target cell controller.

6. The method of claim 5 wherein:
   a second cell change response command is used by a target cell to instruct a mobile station to perform a handover, the second command containing a description of allocated resources for the circuit switched call;
   wherein the first cell change response command includes at least a first set of contents in respect of performing a cell change, the first command containing no description of resources for the circuit switched call in the target cell of the first cell change response command; and
   wherein the second cell change response command includes at least a second set of contents in respect of performing a handover, the second command containing a description of allocated resources for the circuit switched call in the target cell of the second cell change response command.

7. The method of claim 6 wherein:
   the first cell change response command including the first set of contents comprises a cell change response command containing an indication to perform cell reselection and an indication that no resources have been allocated.

8. The method of claim 5 wherein the first cell change response command comprises at least one of:
   at least one indication of whether inbound handover is supported for the target cell;
   at least one indication of whether to perform reselection to the target cell; and
   an indication that no resources have been allocated.

9. The method of claim 8 wherein the at least one indication of whether inbound handover is supported for the target cell comprises a respective indicator for each of:
   circuit switched handover;
   packet switched handover; and
   DTM (dual transfer mode) handover.

10. The method of claim 8 wherein the at least one indication of whether to perform reselection to the target cell comprises:
    a field having a first state that instructs the mobile station to perform reselection to the target cell even though no description of resources for the circuit switched call in the target cell has been received, the field having a second state distinct from the first state.

11. The method of claim 10 wherein the first state is an indication that there is support for call re-establishment after the cell change.

12. The method of claim 5 wherein the first cell change response command further comprises a reference number allocated by the target cell controller to allow the mobile station to identify itself to the target cell controller.

13. A method for a mobile station comprising:
    establishing a circuit-switched call;
    receiving a first command during the circuit-switched call that instructs the mobile station to perform a cell change to an identified target cell and that instructs the mobile station to re-establish a circuit-switched call within the identified target cell without having target cell resources needed for re-establishing the circuit switched call within the identified target cell reserved, the command containing no description of resources for the circuit switched call in the target cell;

wherein upon receipt of the first command, the mobile station is not otherwise aware of resources for the circuit switched call in the target cell;

performing a cell change to the target cell without having target cell resources needed for re-establishing the circuit switched call within the identified target cell reserved.

14. The method of claim 13 wherein in response to the first command, performing a cell change to the target cell comprises at least one of:

using call re-establishment signalling with the target cell; and sending a call re-establishment message to the target cell.

15. The method of claim 13 further comprising:

receiving a second command during a circuit switched call that instructs the mobile station to perform a cell change to a target cell and that instructs the mobile station to re-establish the circuit-switched call within the target cell, the command containing a description of resources for the circuit switched call in the target cell;

wherein the first command includes at least a first set of contents in respect of performing a cell change without describing any resources for the circuit switched call in the target cell of the first command;

wherein the second command includes at least a second set of contents in respect of performing a cell change and describes resources for the circuit switched call in the target cell of the second command.

16. The method of claim 15 wherein:

the first command includes at least a first set of contents and comprises a cell change response command from a controller of the target cell, and the cell change response command contains an indication to perform cell reselection, and an indication that no resources have been allocated.

17. The method of claim 16 wherein each cell change response command comprises:

at least one indication of whether inbound handover is supported to the target cell; and at least one indication of whether to perform reselection to the target cell.

18. The method of claim 17 wherein the at least one indication of whether inbound handover is supported to the target cell comprises a respective indicator for each of:

circuit switched handover;

packet switched handover; and

DTM (dual transfer mode) handover.

19. The method of claim 17 wherein the at least one indication of whether to perform reselection to the target cell comprises:

a field having a first state that instructs the mobile station to perform reselection to the target cell even though no description of resources for the circuit switched call in the target cell has been received, the field having a second state distinct from the first state.

20. The method of claim 19 wherein the field being set to the first state is an indication that there is support for call re-establishment after the cell change.

21. The method of claim 15 wherein the cell change response command further comprises a reference number allocated by a controller of the target cell to allow the MS to identify itself to the target cell quickly.

* * * * *